United States Patent
Fan

(10) Patent No.: US 8,474,775 B2
(45) Date of Patent: Jul. 2, 2013

(54) FOLDABLE AND ADJUSTABLE SUPPORTING APPARATUS FOR PORTABLE DEVICES

(76) Inventor: Eagle Fan, Hsinchu (TW)

( * ) Notice: Subject to any disclaimer, the term of this patent is extended or adjusted under 35 U.S.C. 154(b) by 122 days.

(21) Appl. No.: 13/219,664

(22) Filed: Aug. 27, 2011

(65) Prior Publication Data

US 2013/0048824 A1  Feb. 28, 2013

(51) Int. Cl.
*A47B 91/00* (2006.01)
*A47B 95/00* (2006.01)

(52) U.S. Cl.
USPC ............ 248/349.1; 248/176.1; 248/346.01; 248/346.03; 248/918; 361/679.44

(58) Field of Classification Search
USPC ............ 248/917–923, 456, 461, 685, 687, 248/444; 439/534, 533; 361/679.44, 679.21
See application file for complete search history.

(56) References Cited

U.S. PATENT DOCUMENTS

| D429,487 S | * | 8/2000 | Loh et al. ............... D14/447 |
| 6,608,749 B2 | * | 8/2003 | Hubbard ............... 361/679.09 |
| 6,679,468 B1 | * | 1/2004 | Hsu ............... 248/454 |
| D520,013 S | * | 5/2006 | Yang ............... D14/434 |
| 7,042,713 B2 | * | 5/2006 | Nicolosi ............... 361/679.44 |
| 7,516,933 B2 | * | 4/2009 | Moon et al. ............... 248/441.1 |
| 7,817,436 B2 | * | 10/2010 | Peiker ............... 361/755 |
| 8,161,890 B2 | * | 4/2012 | Wang ............... 108/6 |
| 2002/0032041 A1 | * | 3/2002 | Hirai et al. ............... 455/557 |

* cited by examiner

*Primary Examiner* — Amy J Sterling

(57) ABSTRACT

A foldable and adjustable supporting apparatus is provided, including a base, an adjusting element, a receiving element and a positioning unit. The apparatus provides support to an object, such as, portable electronic device, to stand in various tilt angles. The receiving element is coupled to the base, and can rotate more than 270°. The adjusting element and positioning element located on the base are responsible for maintaining the tilt angle of the rotated receiving element. The apparatus, when not in use, can be folded into a box-like appearance. When in use, the apparatus can be expanded to provide support to portable electronic device to remain in standing position.

7 Claims, 8 Drawing Sheets

FOLDABLE AND ADJUSTABLE SUPPORTING APPARATUS FOR PORTABLE DEVICES

FIELD OF THE INVENTION

The present invention generally relates to a supporting apparatus for portable devices, and more specifically to a foldable and adjustable supporting apparatus for portable devices, such as, tablet PC, so as to provide support for various positions or angles as well as easiness to fold and carry.

BACKGROUND OF THE INVENTION

The touch panel technology and related application software development have made the popularity of tablet PC an unstoppable trend. Small size and portability enable the users to bring a tablet PC virtually everywhere, indoor or outdoor, at home or in the office, or even in public transportation.

Other portable electronic devices, such as, smart phone, PDA, portable media player (PMP), e-book reader, mobile Internet device (MID), and smartbook, are also a part of the consumer electronic market spectrum. All these types of devices share a common need that the user often needs to hold the device in one hand and use the other hand to operate the touch panel. In addition, the display of these types of devices often allows the user to select the display in either vertical (portrait) or horizontal (landscape) modes.

Although most of these types of devices take the weight into account when designing, however, the long-duration holding of the device is still stressful to the wrist and hand without any auxiliary support device, and the hand may shake or quiver to add stress to the viewing. Therefore, auxiliary support devices are developed to provide additional support to relieve the stress. In particular, many supporting apparatus are designed to hold the portable device in a standing position at a tilt angle on a flat surface, such as, on a desk top, to free the hand from holding the device. However, an effective supporting apparatus must also be portable so as to be carried everywhere with the portable device. In other words, a foldable and adjustable supporting apparatus is likely more desirable to achieve the object of portability.

SUMMARY OF THE INVENTION

The primary object of the present invention is to provide a foldable and adjustable supporting apparatus for portable device that can be easily folded into a small box when not in use. Also, the accessories of the portable device, such as connectors and lines, can be stored in the box to further portability and convenience.

Another object of the present invention is to provide a stable supporting apparatus with an adjustable base area that can be expanded as the tilt standing angle of the portable device increases so that the mass of center of the portable device remains within the base area.

To achieve the above objects, the present invention provides a base, an adjusting element, a receiving element and a positioning unit. The adjusting element can slide laterally on the base. The adjusting element further includes a push block. The positioning unit is formed on the base and the adjusting element to fix the position of the adjusting element on the base after sliding. The receiving element is coupled to the base. The receiving element further includes a placement trench. When not in use, the receiving element covers the base to form a box-like appearance. When in use, the receiving element must be rotated over 270°, so that the placement trench of the receiving element is exposed to receive the placement of a portable electronic device. The push block of the adjusting element pushes against the outer wall of the receiving element to fix the tilt angle of the receiving element after the rotation.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
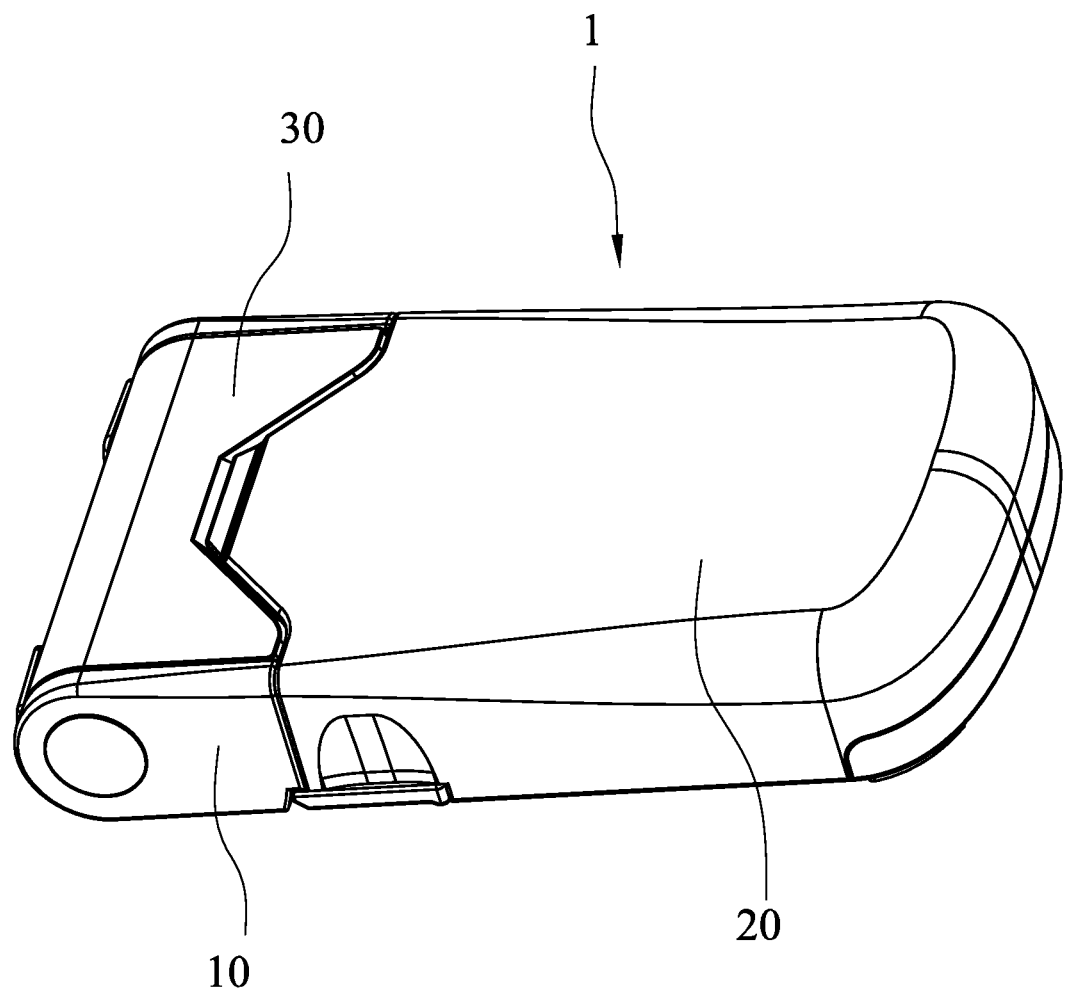
FIG. 1 shows a schematic view of the present invention.
Figure 2:
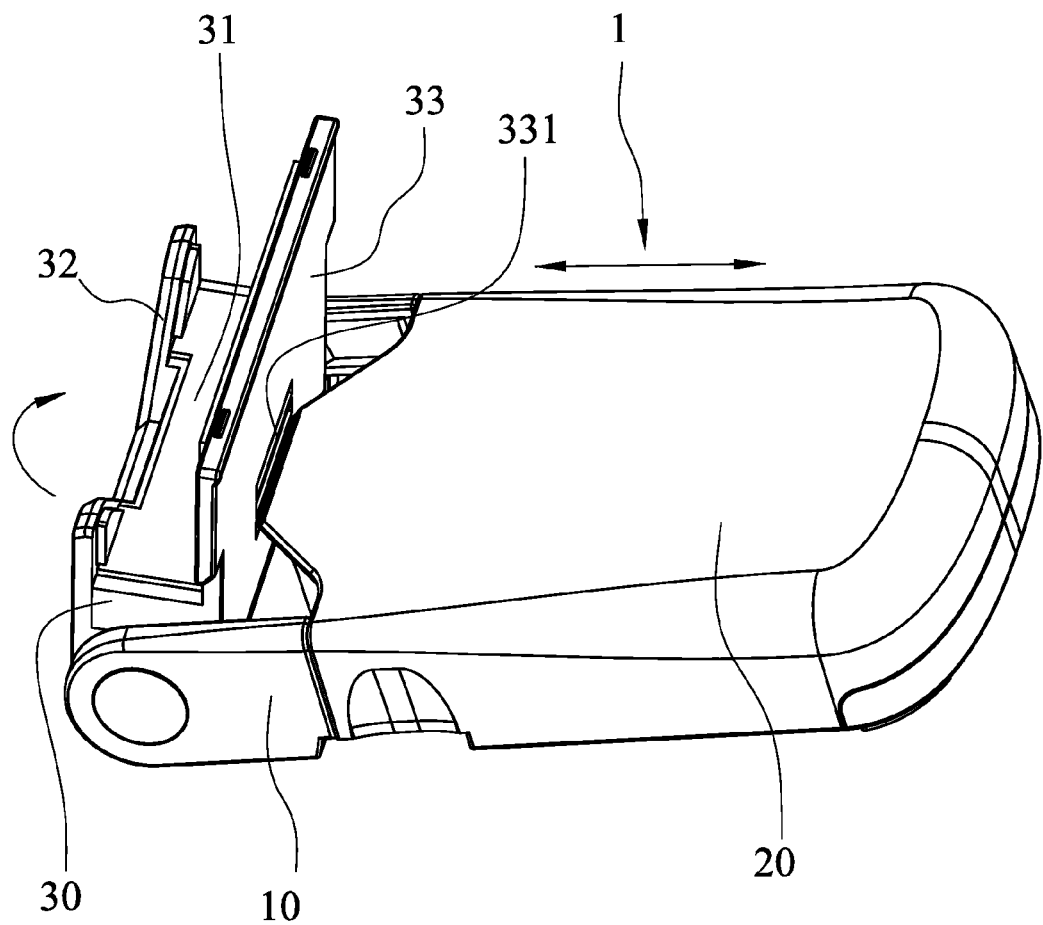
FIG. 2 shows a schematic view of the present invention when in use.

FIG. 1 and FIG. 2 show schematic views of the present invention in folded state and in use state, respectively. Supporting apparatus 1 for portable device according to the present invention includes a base 10, an adjusting element 20 and a receiving element 30 and a positioning unit 40. When not in use, receiving element 30 covers base 10 to form a box-like appearance. To use supporting apparatus 1, receiving element 30 must be rotated more than 270° to expose a hidden placement trench 31. Then, with adjusting element 20 pushing against on outer wall of receiving element 30, the tilt angle of receiving element 30 can be fixed. Placement trench 31 provides accommodation for a portable electronic device to place a bottom edge to push against inside of placement trench 31 so that the portable electronic device, such as a tablet PC, can stay in a standing position on a flat surface, such as, a desk top, with a tilt angle. In addition, the adjustment of tile angle of receiving element 30 can be achieved by sliding adjusting element 20 on base 10 to control the position of adjusting element 20 on base 10.

Figure 3:
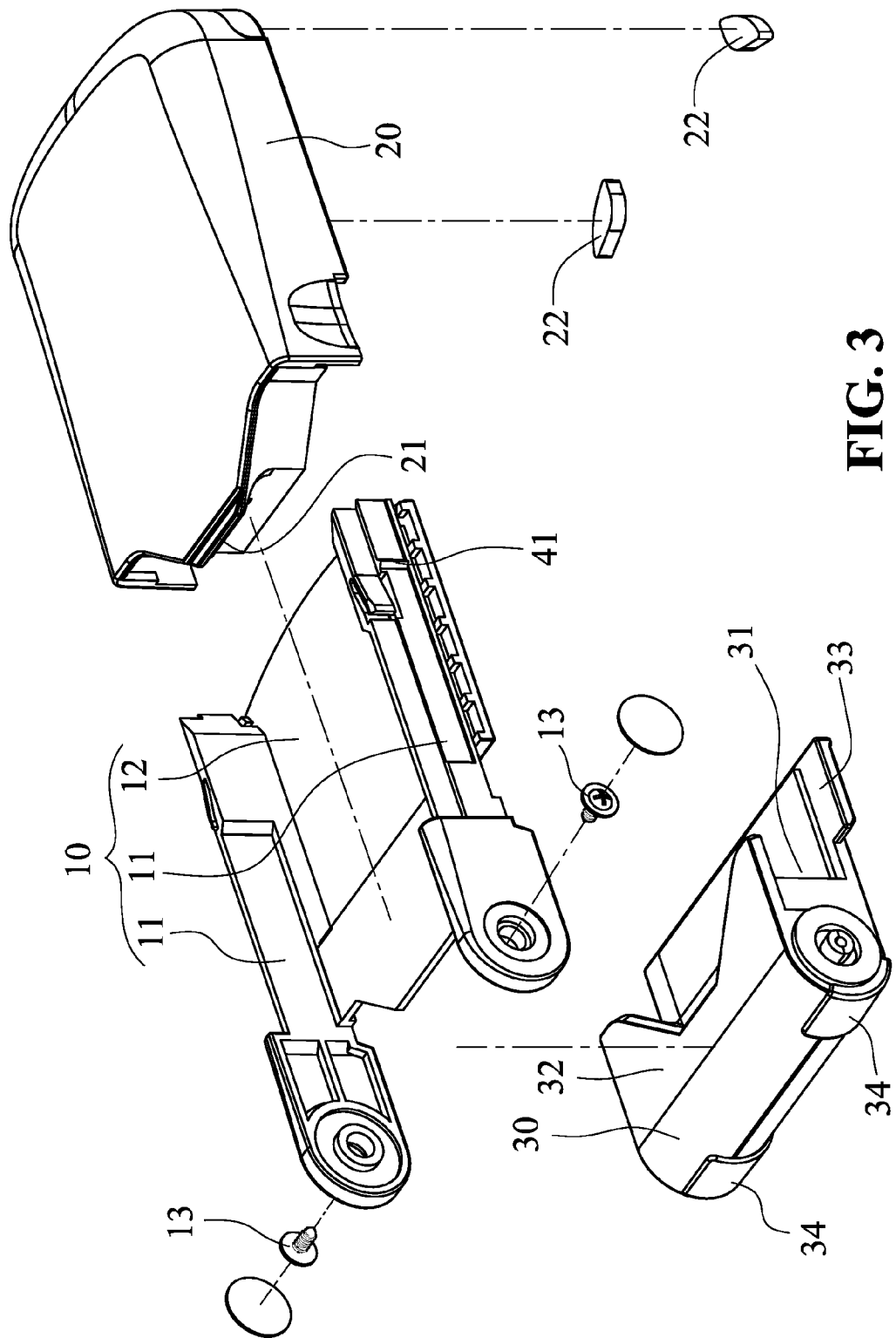
FIG. 3 shows a schematic exploded view of the present invention.

The following describes the details of each component of the present invention. As shown in FIG. 3, base 10 is coupled to receiving element 20 and allows adjusting element 20 sliding on. Base 10 includes two parallel side walls 11 and a bottom plate 12 connecting two side walls 11. A part of each of side walls 11 extends sideward like a hanging arm. The extending part can be used for coupling to receiving element 30 with screw 13. The part of side walls 11 away from coupling position with receiving element 30 can be viewed as a track to facilitate lateral sliding of adjusting element 20 on two side walls 11.

Figure 4:
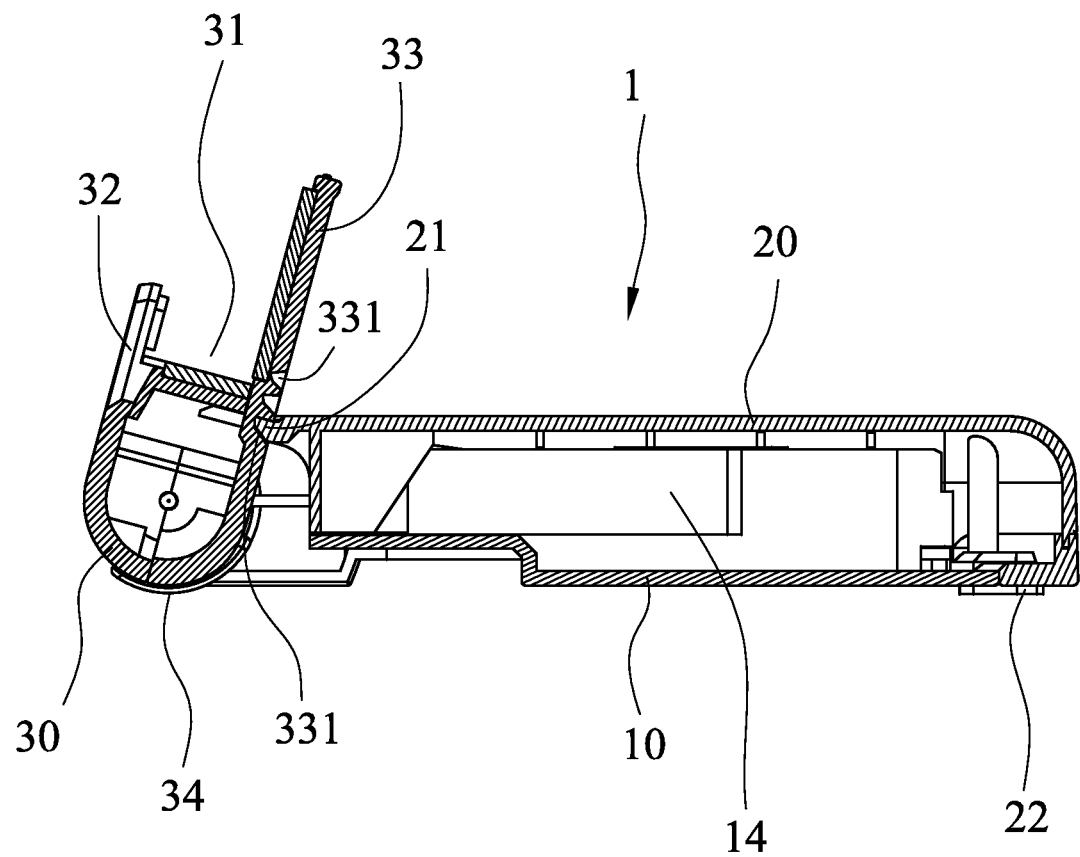
FIG. 4 shows a cross-sectional view of FIG. 2.

The top and the boundary of adjusting element 20 form a close-in state, but the bottom of adjusting element is not sealed so that a housing space 14 (shown in FIG. 4) is formed between base 10 and adjusting element 20 when adjusting element 20 is placed on base 10. Housing space 14 can be used to store accessories, such as, connection lines, of portable electronic device. Adjusting element 20 further includes a push block 21 protruding from top of adjusting element 20. The location of push block 21 is near receiving element 30. The main purpose of push block 21 is to push against an outer wall of receiving element 30, Adjusting element 20 can slide on base 10 in order to change the contact location of push block 21 and the outer wall of receiving element 30 to achieve the adjustment of tile angle of receiving element 30.

Adjusting element 20 further includes a function of changing base area of supporting apparatus 1. In the present invention, the legs of supporting apparatus 1 are located at the bottom of receiving element 30 and adjusting element 20, respectively. Adjusting element 20 moves in a direction perpendicular to center line of coupling of base 10 and receiving element 30. When the tilt angle of receiving element 30 increases, the center of mass of the portable device also moves backwards. In the present invention, when title angle of receiving element 30 increases, displacement distance of adjusting element 20 also increases so that the overall base area will extend towards the direction of tilt to stabilize the portable electronic device.

Receiving element 30 is coupled to base 10, and circumference of coupling further includes a first outer wall 32 and a second outer wall 33 extending tangently at opposite ends of diameter line. A placement trench 31 is formed between two outer walls to accommodate bottom edge of portable electronic device to push against inside the trench. Receiving element 30 of the present invention can rotate over 270°. When not in use, first outer wall 32 and second outer wall 33 connect to match with base 10 and placement trench 31 is hidden between two side walls 11 of base 10 so that supporting apparatus appears like a box. When in use, receiving element 30 is rotated with a wide angle to expose placement trench 31. In addition, a plurality of positioning trenches 331 is formed on outside surface of outer wall 33. Positioning trenches 331 are for push block 21 of adjusting element 20 to push against. Each of positioning trench 331 provides a different title angle for receiving element 30.

Figure 5A:
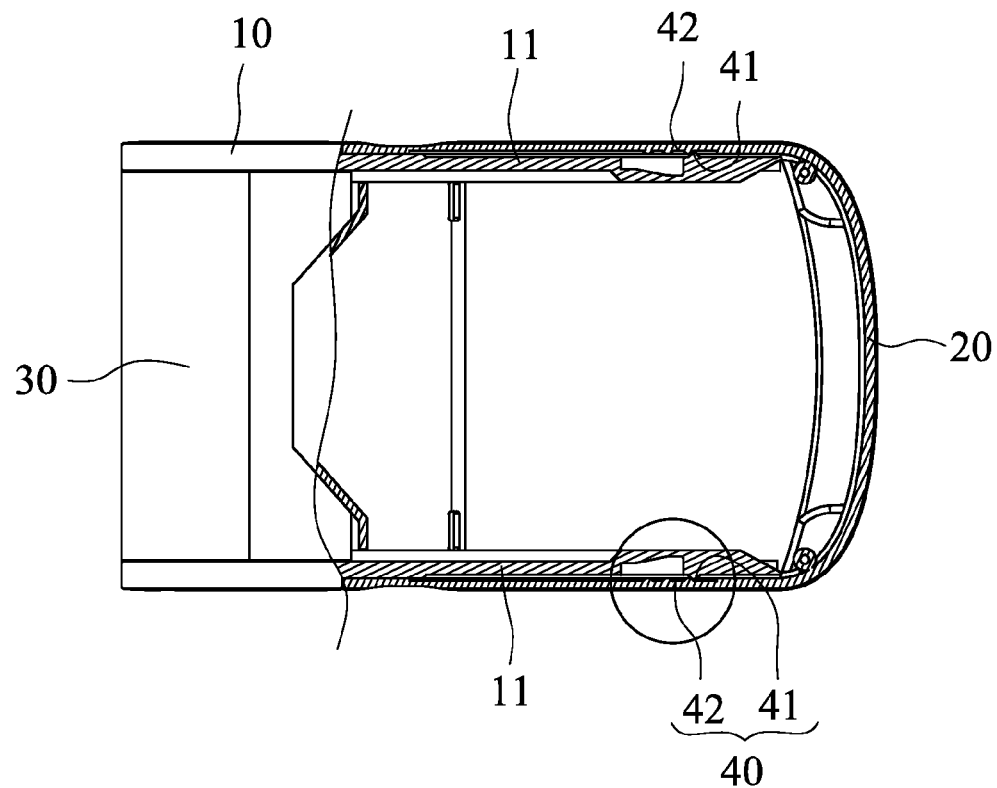
FIG. 5A shows another cross-sectional view of FIG. 1.
Figure 5B:
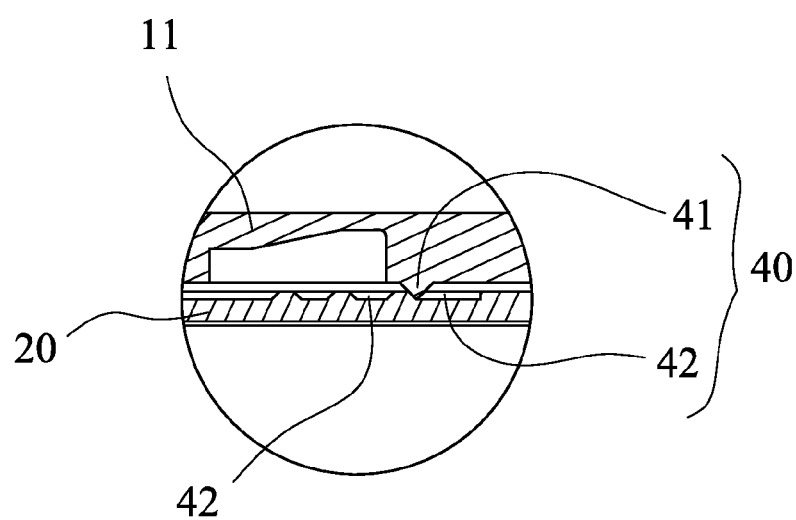
FIG. 5B shows a partially enlarged view of FIG. 5A.

As shown in FIG. 3, FIG. 5A and FIG. 5B, positioning unit 40 is located on base 10 and adjusting element 20 respectively to fix the location of adjusting element 20 on base 10 and to prevent adjusting element 20 from sliding. Positioning unit 40 can be of various forms; for example, base 10 and adjusting element 20 can be lightly-tightly coupled, i.e., a light force applied on adjusting element 20 can enable sliding, while it is difficult to slide when external force vanishes. The present invention provides another embodiment. Positioning unit 40 includes a tooth 41 and a plurality of stop grooves 42. Tooth 41 is located on outside wall of side wall 11 of base 10 and stop grooves are formed on adjusting element 20 at the wall facing side walls 11. When tooth 41 is stuck inside stop grooves 42, the relative position between adjusting element 20 and base 10 is fixed. Adjusting element 20 of the present invention has a shape of a cover, having two vertical sides with resilience to allow slight deformation. A force above a threshold can pull adjusting element 20 to adjust the position of adjusting element 20 on base 10.

To improve the anti-slipping effect, receiving element 30 further includes at least one anti-slipping block 34. Anti-slipping blocks 34 are distributed on outer surface of part of boundary of receiving element 30. In addition, adjusting element 20 includes anti-slipping pad 22, located at two corners of bottom of adjusting element 20. The aforementioned legs of supporting apparatus are constituted by aforementioned anti-slipping blocks 34 and anti-slipping pad 22.

Figure 6:
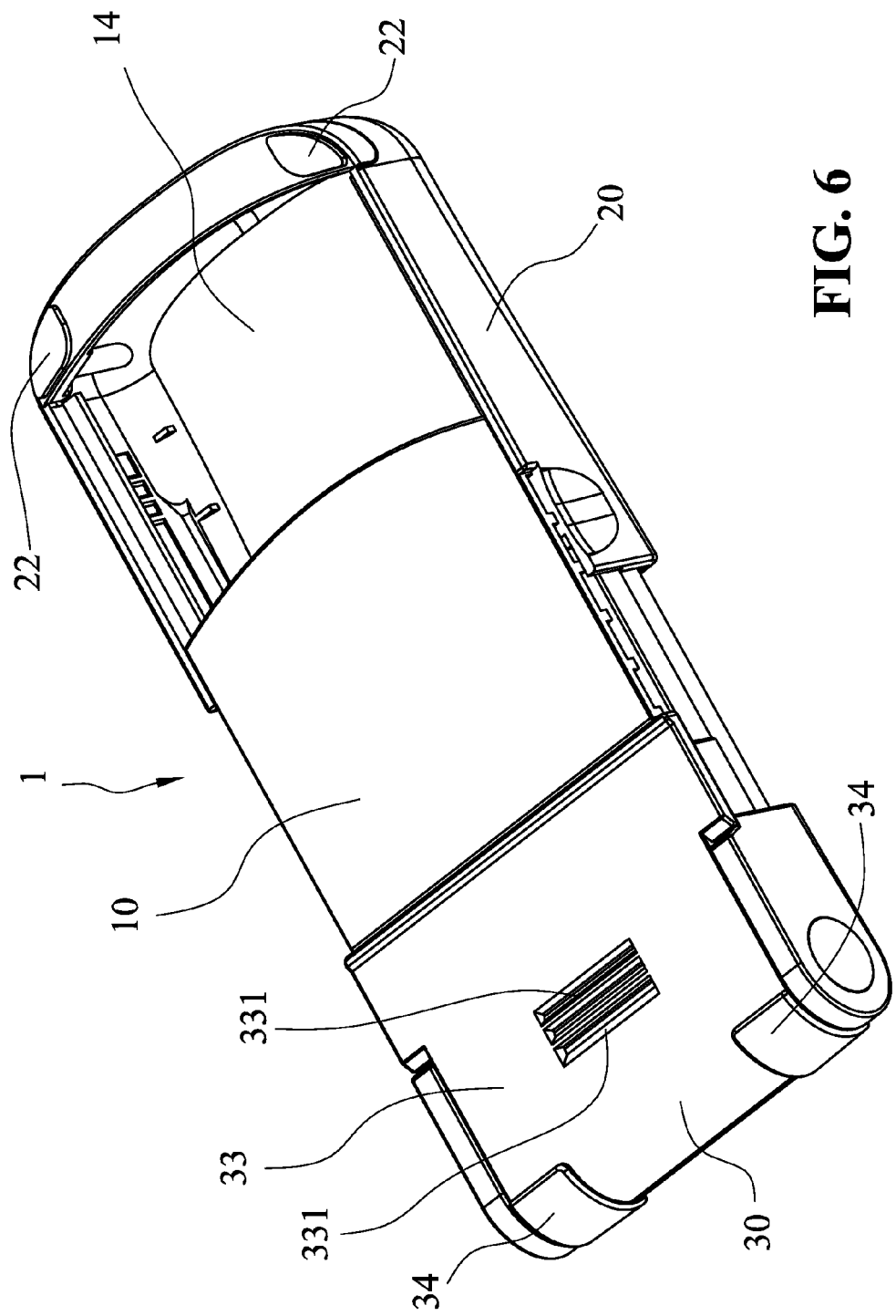
FIG. 6 shows a schematic view of adjusting element open to expose the housing space inside according to the present invention.

As shown in FIG. 6, when sliding adjusting element 20 on base 10 widely, housing space 14 of base 10 will be exposed. At this point, the accessories, such as connection lines, of portable device can be put into or retrieve from housing space 14.

Figure 7:
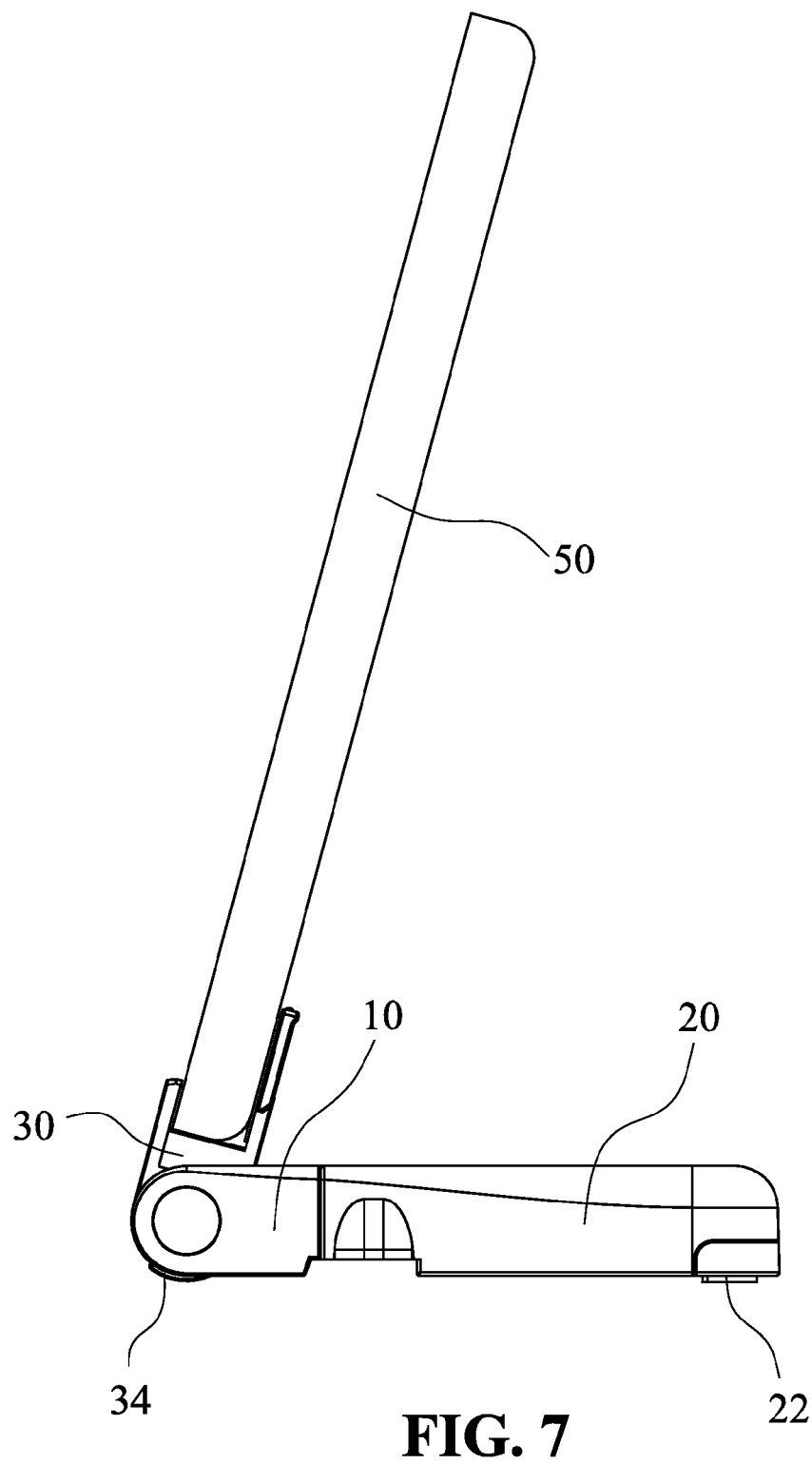
FIG. 7 shows a schematic view of the present invention applied to a tablet PC standing in a portrait mode.
Figure 8:
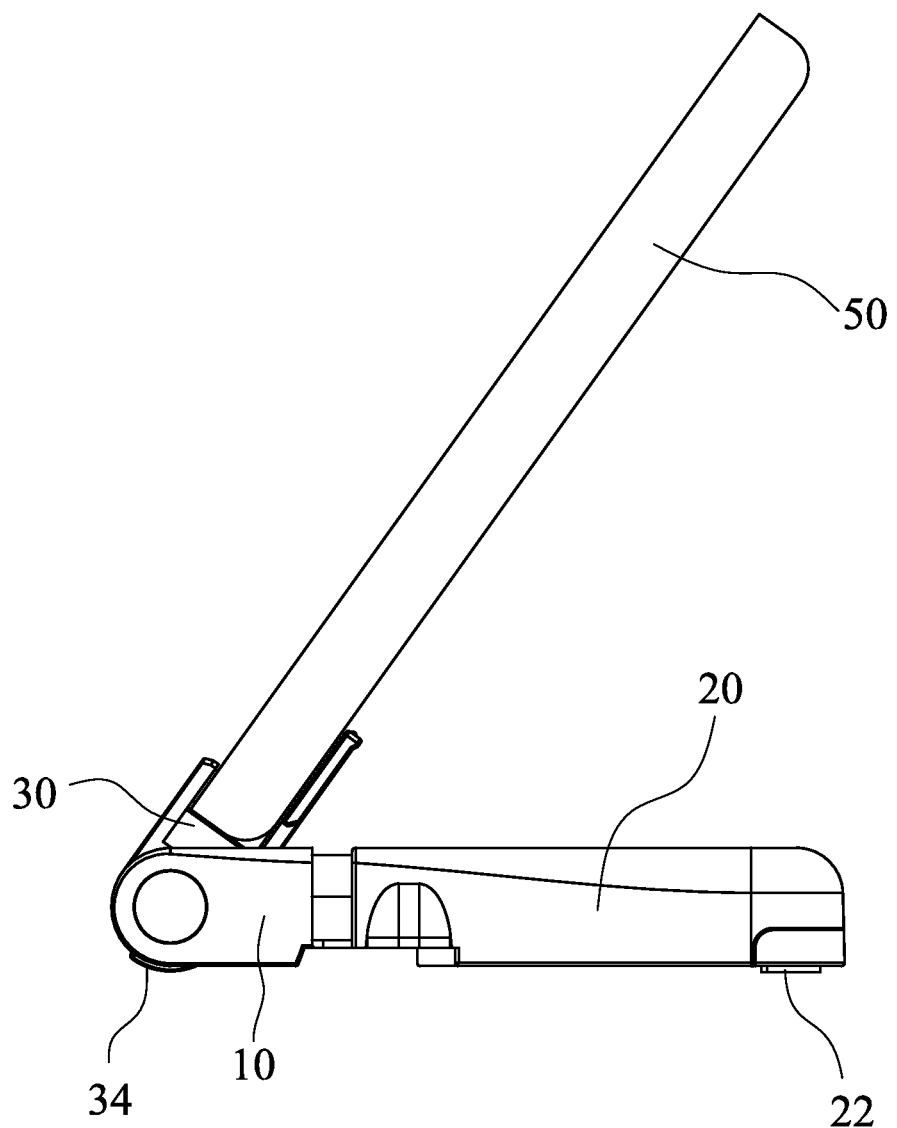
FIG. 8 shows a schematic view of the present invention applied to a tablet PC standing in a landscape mode.

FIG. 7 and FIG. 8 show side views of different title angles of receiving element 30. When a tablet PC 50 has the bottom edge placed inside placement trench 31 of receiving element 30, tablet PC 50 can stand with different tilt angles. Tablet PC 50 stands in a portrait mode in FIG. 7 while tablet PC 50 in FIG. 8 stands in a landscape mode. As seen in both figures, the more tablet PC 50 tilts, the farther behind the position of adjusting element 20 is, so as to expand the base area.

In summary, the supporting apparatus of the present invention uses the adjusting element sliding on the base to change the tilt angle of the receiving element as well as expands the base area to enhance stability of portable electronic device in standing position. The supporting apparatus also includes a housing space for storing accessories for the portable electronic device to further improve the portability of the supporting device.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A foldable and adjustable supporting apparatus, comprising:
    a base;
    an adjusting element, laterally slidable on said base, said adjusting element further comprising a push block;
    a positioning unit, formed on said base and said adjusting element respectively for fixing a position of said adjusting element on said base; and
    a receiving element, coupled to said base, said receiving element further comprising a placement trench;
    wherein said receiving element covers said base to form an appearance of a box when not in use, to use said apparatus, said receiving element is rotated more than 270° to expose said placement trench, and said push block of said adjusting element presses against an outer wall of said receiving element to fix a tilt angle for said receiving element, said tilt angle being changed as said position of said adjusting element on said base changes.

2. The supporting apparatus as claimed in claim 1, wherein said base further comprises at least two parallel side walls and a bottom plate connecting said two side walls, a part of each of said two side walls extends outward and said receiving element is coupled between the extended parts of said two side walls.

3. The supporting apparatus as claimed in claim 1, wherein said positioning unit further comprises a tooth and a plurality of stop grooves, said tooth is formed on an outer wall of said side walls of said base, said plurality of stop grooves is formed on a wall of said adjusting element facing said side walls, and when said tooth is in said stop grooves, a relative position between said adjusting element and said base is fixed.

4. The supporting apparatus as claimed in claim 1, wherein a plurality of positioning trenches is formed on said outer wall of said receiving element, and when said apparatus is in use, said push block of said adjusting element presses against one of said plurality of positioning trenches is formed on said outer wall of said receiving element.

5. The supporting apparatus as claimed in claim 1, wherein a housing space is formed between said adjusting element and said base, and said housing space is exposed when said adjusting element slides open.

6. The supporting apparatus as claimed in claim 1, wherein said adjusting element slides in a direction perpendicular to a center line of coupling of said base and said receiving element.

7. The supporting apparatus as claimed in claim 1, wherein said receiving element further comprises at least one anti-slipping block, said at least one anti-slipping block is distributed on said outer wall of said receiving element around boundary, said adjusting element further comprises at least one anti-slipping pad, said at least one anti-slipping pad is located at two bottom corners of said adjusting element, and said at least one anti-slipping block and said at least one anti-slipping pad form legs of said apparatus.

\* \* \* \* \*